April 3, 1928.

W. J. SHAY

DISPLAY STAND

Filed Oct. 26, 1925

1,664,530

INVENTOR:
Warren J. Shay
BY
ATTORNEY

Patented Apr. 3, 1928.

1,664,530

UNITED STATES PATENT OFFICE.

WARREN J. SHAY, OF CHICAGO, ILLINOIS, ASSIGNOR TO THE COLUMBUS McKINNON CHAIN COMPANY, OF COLUMBUS, OHIO, A CORPORATION OF OHIO.

DISPLAY STAND.

Application filed October 26, 1925. Serial No. 64,799.

This invention relates to a stand for displaying tire chains as they appear when applied to an automobile wheel.

Heretofore, in order to display a tire chain to advantage, the chain has been mounted upon an ordinary automobile tire and the tire may or may not be mounted on a display wheel, but in either case the cost of the actual tire or tire and wheel used in displaying the tire chain has been considerable.

It is highly desirable that a device be provided for displaying tire chains to advantage, while at the same time the expense of exhibiting the same upon an actual automobile tire is avoided.

The present invention therefore relates to a display stand which may be constructed at a very small cost to simulate an automobile tire in size, and appearance so that a tire chain may be displayed upon this imitation tire in the same manner that it has been displayed heretofore on actual automobile tires.

The imitation tire may be constructed of sheet metal or other stiff sheet material at a slight cost and it may be painted to resemble a tire in appearance, and it preferably is provided with a central disk that may be painted to resemble an automobile wheel in appearance, and advertising matter may be displayed upon this disk. The imitation tire in its preferred construction is also provided with a supporting stand or pedestal for holding it in an upstanding position.

The various features of the invention and novel combination of parts will be hereinafter described in connection with the accompanying drawings which illustrate one good, practical form of the invention.

In the drawings—

Figures 1, 2:
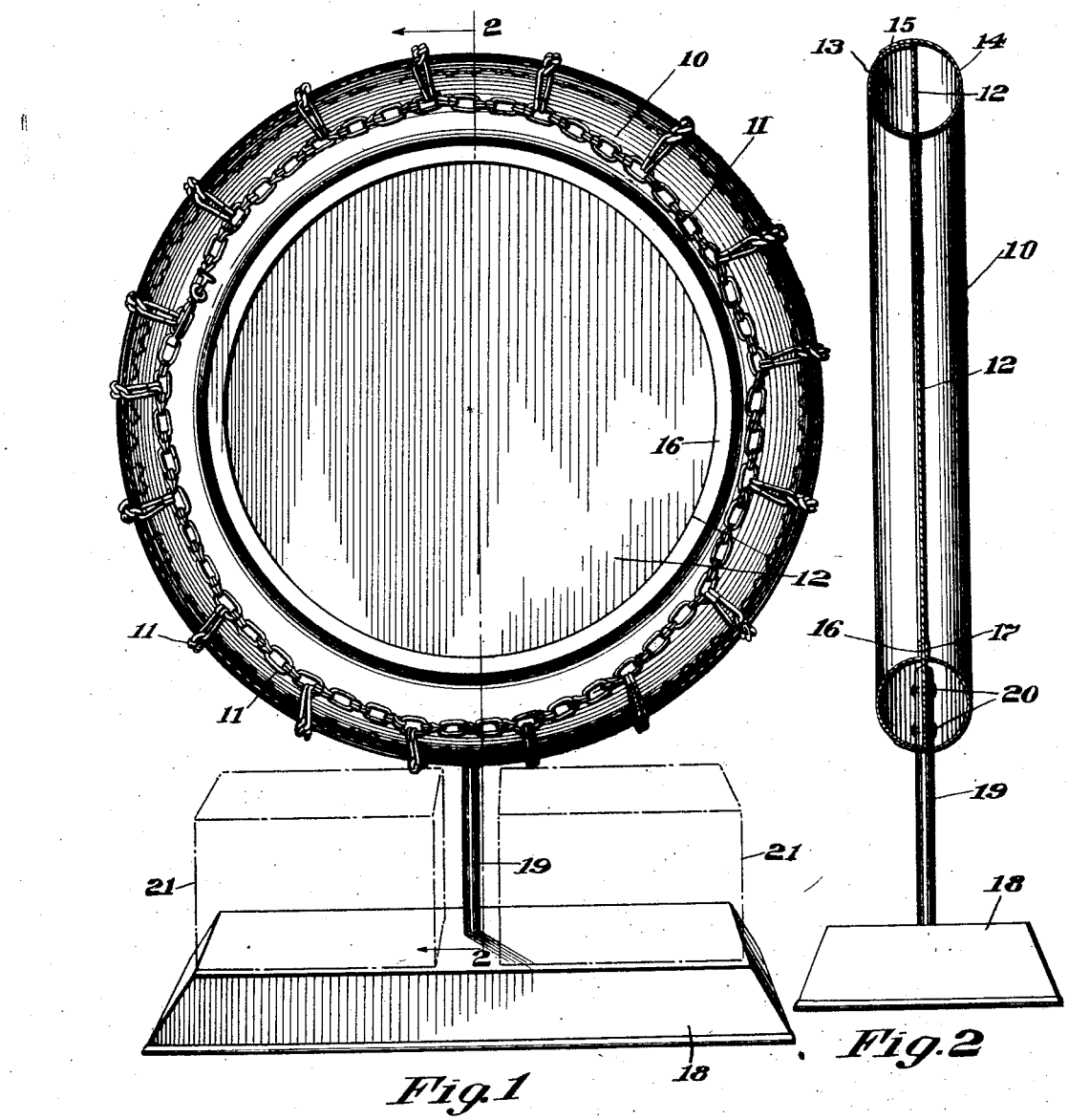
Fig. 1 is a front elevation of a complete display stand constructed in accordance with the present invention; and—
Fig. 2 is a vertical sectional view taken on the line 2—2 of Fig. 1.

The imitation tire 10 shown in the drawings may be conveniently formed of sheet metal or other thin stiff material having sufficient rigidity to maintain the shape of a tire and support a tire chain 11 thereupon, as shown in the drawing, and the imitation tire is preferably provided with a central disk 12 formed of sheet metal or other thin, stiff material.

The imitation tire 10 may be variously formed and is shown as constructed of two strips of material 13 and 14 each of which is bent in cross-section in the arc of a circle to form a trough shaped ring as will be apparent from Fig. 2. The two rings 13 and 14 are secured together in the construction shown by providing the ring 14 with an overlapping marginal portion 15 that is forced or crimped into snug engagement with the marginal edge portion of the ring 13.

The disk 12 is shown as being large enough in diameter to fit snugly within the ring 14 with the outer periphery of the disk engaging the portion 15 of the ring. This construction serves to hold the disk properly centered within the imitation tire or annulus 10 with an edge of the ring 13 abutting against the outer marginal edge of the disk 12, but it obviously is not essential that the disk 12 shall be this large in diameter, since if desired the inwardly extending flanges 16 and 17 of the rings 13 and 14 may be rigidly secured to the disk 12 to hold the disk properly centered within the annulus.

It is desirable to provide means for holding the imitation tire or annulus 10 in a vertical or substantially vertical position, and while various forms of supports may be devised to this end, a desirable construction consists of a base or pedestal 18 having an upstanding post 19 the upper end of which is secured to the annulus 10, in the construction shown, by forming a hole in the annulus to receive the post, and the upper portion of the post is slotted to receive the disk 12 which is secured in the slotted portion by rivets 20.

As a result of the construction described, an extremely pleasing tire chain display stand is provided which may be manufactured at a small cost, and by painting the annulus 10 to resemble an automobile tire, and the disk 12 to resemble the hub, disk and rim of an automobile wheel, the display stand will closely resemble an automobile disk wheel having a tire chain mounted upon its tire.

The disk 12 also affords a relatively large surface upon which advertising matter relating to the tire chain may be displayed, and the cartons or packages in which the tire chains are usually sold may be shown in connection with the display stand by placing a carton upon the base 18 at each side of the post 19 as indicated in dotted lines at 21.

What is claimed is:—

1. A tire chain display stand, comprising in combination a central disk, and a non-inflatable annulus surrounding the disk and mounted thereupon to receive a tire chain, said annulus having the size and shape of an automobile tire and formed of overlapping sections of sheet material that are arc shaped in cross-section and one of which embraces the other and has a crimped edge to hold the sections assembled and in abutting engagement with the opposite sides of the disk, and a stand for supporting the annulus in an upstanding position.

2. A tire chain display stand, comprising in combination, a hollow non-inflatable annulus formed of thin but stiff sheet material and having the size and shape of an automobile tire to receive a tire chain, and a stand for supporting the annulus in an upright position comprising a base and a post extending upwardly from the base and extending into the hollow annulus.

In testimony whereof, I have signed my name to this specification.

WARREN J. SHAY.